US012084735B2

(12) United States Patent
Shinohara

(10) Patent No.: US 12,084,735 B2
(45) Date of Patent: Sep. 10, 2024

(54) METAL STRIP AND MANUFACTURING METHOD THEREFOR, MAGNETIC CORE, AND COIL COMPONENT

(71) Applicant: Murata Manufacturing Co., Ltd., Kyoto-fu (JP)

(72) Inventor: Gota Shinohara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 832 days.

(21) Appl. No.: 17/131,605

(22) Filed: Dec. 22, 2020

(65) Prior Publication Data

US 2021/0108280 A1 Apr. 15, 2021

Related U.S. Application Data

(63) Continuation of application No. PCT/JP2019/021934, filed on Jun. 3, 2019.

(30) Foreign Application Priority Data

Jun. 29, 2018 (JP) ................................ 2018-124186

(51) Int. Cl.
*C21D 8/12* (2006.01)
*C22C 45/02* (2006.01)
(Continued)

(52) U.S. Cl.
CPC ............ *C21D 8/1211* (2013.01); *C22C 45/02* (2013.01); *H01F 3/04* (2013.01); *H01F 17/04* (2013.01);
(Continued)

(58) Field of Classification Search
None
See application file for complete search history.

(56) References Cited

U.S. PATENT DOCUMENTS

2017/0178805 A1* 6/2017 Yoshizawa ......... B22D 11/0614

FOREIGN PATENT DOCUMENTS

CN 103348420 A 10/2013
JP S56-153709 A 11/1981
(Continued)

OTHER PUBLICATIONS

International Search Report issued in PCT/JP2019/021934; mailed Aug. 20, 2019.
(Continued)

*Primary Examiner* — Anthony M Liang
(74) *Attorney, Agent, or Firm* — Studebaker & Brackett PC

(57) ABSTRACT

A metal strip contains a metal magnetic material as a main component, and is formed such that a surface roughness of one main surface is higher than a surface roughness of an other main surface. The other main surface is formed in a smooth surface having a high surface smoothness, and the one main surface is subjected to surface treatment such that a striped pattern composed of a recessed portion and a protruding portion is continuously formed. After a continuous strip is made by a single-roll liquid quenching method, the striped pattern is formed by subjecting one main surface of the continuous strip to surface treatment. A magnetic core is obtained by winding the metal strip in an annular shape, and a coil component, such as a common mode choke coil, is obtained by using the magnetic core. Thus, the metal strip has sufficient toughness and good mechanical strength.

16 Claims, 4 Drawing Sheets

(51) Int. Cl.

| | |
|---|---|
| ***H01F 3/04*** | (2006.01) |
| ***H01F 17/04*** | (2006.01) |
| ***H01F 27/06*** | (2006.01) |
| ***H01F 27/42*** | (2006.01) |
| *H01F 17/00* | (2006.01) |

(52) U.S. Cl.

CPC ............. *H01F 27/06* (2013.01); *H01F 27/42* (2013.01); *C22C 2202/02* (2013.01); *H01F 2017/0093* (2013.01)

(56) References Cited

FOREIGN PATENT DOCUMENTS

| | | | | |
|---|---|---|---|---|
| JP | 2003-311379 A | | 11/2003 |
| JP | 2012126973 A | * | 7/2012 |
| WO | 2012/102379 A1 | | 8/2012 |

OTHER PUBLICATIONS

Written Opinion issued in PCT/JP2019/021934; mailed Aug. 20, 2019.

* cited by examiner

METAL STRIP AND MANUFACTURING METHOD THEREFOR, MAGNETIC CORE, AND COIL COMPONENT

CROSS-REFERENCE TO RELATED APPLICATIONS

This application claims benefit of priority to International Patent Application No. PCT/JP2019/021934, filed Jun. 3, 2019, and to Japanese Patent Application No. 2018-124186, filed Jun. 29, 2018, the entire contents of each are incorporated herein by reference.

BACKGROUND

Technical Field

The present disclosure relates to a metal strip and a manufacturing method therefor, a magnetic core, and a coil component and, more specifically, to a metal strip and a manufacturing method therefor suitable for a winding coil, such as a common mode choke coil, a magnetic core, such as a winding core, and a coil component, such as a common mode choke coil using the magnetic core.

Background Art

In coil components used for power transformers, high-frequency transformers, magnetic shields, and the like, metal magnetic materials are widely used.

Particularly, of these metal magnetic materials, amorphous alloys have good soft magnetic properties, so research and development has been actively carried out so far.

For example, Japanese Unexamined Patent Application Publication No. 56-153709 (Claim 1, line 11 in the top left section on page 2 to line 2 in the top right section on the same page, line 10 in the bottom right section on page 2 to line 16 in the same section on the same page, and the like) suggests a wound core formed by winding an amorphous magnetic alloy strip having positive magnetostriction characteristics with a high-smoothness surface of the amorphous magnetic alloy strip faced inward.

In Japanese Unexamined Patent Application Publication No. 56-153709, a continuous strip is made by injecting a melt of amorphous magnetic alloy material onto a high-speed rotating roll that serves as a solid cooling medium, with the result that a magnetic alloy strip of which the surface roughness of a free surface that does not contact with the high-speed rotating roll is higher than the surface roughness of a contact surface that contacts with the high-speed rotating roll is obtained.

In Japanese Unexamined Patent Application Publication No. 56-153709, the contact surface that contacts with the high-speed rotating roll is formed in a smooth surface having a high surface smoothness corresponding to the profile irregularity of the high-speed rotating roll, while, on the other hand, the surface on the opposite side across from the contact surface is the free surface that does not contact with the high-speed rotating roll, so the surface on the opposite side has a lower surface smoothness than the contact surface and is formed to have a high surface roughness. Therefore, when a wound core (magnetic core) is formed by winding a magnetic alloy strip in an annular shape with the contact surface side having a high surface smoothness faced inward and the free surface side having a low surface smoothness faced outward, a compressive stress exerted on the inner side of the wound core reduces as compared to when winding a magnetic alloy strip with the free surface side faced inward. As a result, magnetic anisotropy associated with the compressive stress reduces, and it is possible to reduce an iron loss.

Then, by winding a conductor around the thus obtained annular wound core, a coil component, such as a common mode choke coil, is obtained.

SUMMARY

In recent years, reduction in the size and weight of module components mounted on various electronic devices is needed, and, accordingly, there is a request for reduction in the size of coil components, such as common mode choke coils incorporated in module components.

On the other hand, in this type of coil component, a magnetic core (wound core) is made by winding a metal strip (magnetic alloy strip), and the toughness and mechanical strength of the metal strip are important. In other words, when a metal strip is wound in an annular shape, the outside diameter is slightly greater than the inside diameter, and a stress is exerted on the metal strip when the metal strip is stretched outward. As a result, structural defects, such as breakage and cracks, of the metal strip, tend to easily occur, so the toughness and mechanical strength of the metal strip are important as described above.

Particularly, to achieve reduction in the size of coil components, a core diameter (the inside diameter of a magnetic core) needs to be reduced. Therefore, ensuring toughness and mechanical strength is more and more important.

However, in Japanese Unexamined Patent Application Publication No. 56-153709, one main surface of the metal strip is a free surface that does not contact with the high-speed rotating roll, so the one main surface has a low surface smoothness. For this reason, when the core diameter is formed in a small diameter (for example, less than or equal to 6 mm), sufficient toughness is not ensured, and mechanical strength decreases, with the result that structural defects, such as breakage and cracks, may occur in the wound metal strip.

In addition, in this type of coil component, it is desirable to obtain a large inductance to ensure good magnetic characteristics. To do this, it is desirable to improve the permeability of the magnetic core. In this case, permeability is improved by winding a metal strip such that parts of the metal strip are in close contact with each other to increase the occupancy of the metal strip.

However, when the metal strip is merely wound with the free surface that does not contact with the high-speed rotating roll merely faced outward as in the case of Japanese Unexamined Patent Application Publication No. 56-153709, an air layer is formed between the wound metal strips. Therefore, it is not possible to wind the metal strip such that parts of the metal strip are in close contact with each other. For this reason, permeability is not sufficiently improved, so it is difficult to obtain desired magnetic characteristics.

The present disclosure is made in view of such a situation, and thus provides a metal strip ensuring sufficient toughness and having good mechanical strength and a manufacturing method therefor, a magnetic core using the metal strip, which enables reduction in core diameter, and a coil component, such as a common mode choke coil, using the magnetic core.

When, as in the case of Japanese Unexamined Patent Application Publication No. 56-153709, a magnetic core is formed by winding a metal strip such that one main surface of the metal strip is a free surface, an other main surface is a smooth surface having a high surface smoothness, and the one main surface is faced outward, good mechanical strength and toughness are obtained when a core diameter is large; however, as is also described in the chapter "Technical Problem", when the core diameter is a small diameter less than or equal to, for example, 6 mm, it is difficult to ensure sufficient mechanical strength and toughness, and structural defects, such as breakage and cracks, tend to easily occur in the metal strip.

In this situation, the inventors have diligently conducted research and obtained findings that, by further applying surface treatment such that a striped pattern composed of successive recesses and protrusions on the above-described free surface, when the metal strip is wound in an annular shape, the protruding portions of the striped pattern are stretched in a circumferential direction, a stress exerted on the metal strip is reduced to provide high toughness. As a result, even when the core diameter of a magnetic core is small and less than or equal to 6 mm, it is possible to reduce a stress exerted on the entire metal strip and it is possible to reduce occurrence of structural defects, such as breakage and cracks.

It is also found that, because air sandwiched between metal strips during winding is released to the outside through the recessed portions of the striped pattern as an escape route, it is possible to remove an air layer formed between metal strips, it is possible to increase permeability by improving close contact between parts of the wound metal strip accordingly, and it is possible to improve magnetic characteristics.

The present disclosure is made in accordance with such findings. A metal strip according to the present disclosure contains a metal magnetic material as a main component, the metal strip having a film shape, the metal strip being formed such that a surface roughness of one main surface is higher than a surface roughness of an other main surface. The other main surface is formed in a smooth surface having a high surface smoothness, and the one main surface is subjected to surface treatment such that a striped pattern composed of a recessed portion and a protruding portion is continuously formed.

The "metal magnetic material" also includes alloys.

In the metal strip of the present disclosure, the striped pattern is preferably formed in a vertical direction or substantially vertical direction relative to a longitudinal direction of the one main surface.

As described above, the metal strip of the present disclosure reinforces toughness and ensures mechanical strength by forming a continuous striped pattern, composed of a recessed portion and a protruding portion, on one main surface and forming an other main surface in a smooth surface having a high surface smoothness, and the surface texture of the metal strip is preferably numerically managed such that a three-dimensional surface texture parameter, such as an arithmetic mean height, a maximum height, and an aspect ratio, that defines a three-dimensional surface smoothness falls within the following ranges.

In other words, in the metal strip of the present disclosure, the surface roughness of the one main surface is preferably greater than or equal to five times as high, more preferably, ten times as high, as the surface roughness of the other main surface in terms of an arithmetic mean height that is a three-dimensional surface texture parameter.

In the metal strip of the present disclosure, the surface roughness of the one main surface is preferably greater than or equal to twice as high as the surface roughness of the other main surface in terms of a maximum height that is a three-dimensional surface texture parameter.

In the metal strip of the present disclosure, the surface roughness of the one main surface is preferably less than or equal to 0.9 times as high in terms of an aspect ratio that is a three-dimensional surface texture parameter.

In the metal strip of the present disclosure, the protruding portion preferably has a maximum width of 5 to 60 μm.

Furthermore, in the metal strip of the present disclosure, the protruding portion preferably has a maximum length of 10 to 600 μm.

In the metal strip of the present disclosure, the metal magnetic material is preferably amorphous.

Furthermore, in the metal strip of the present disclosure, the metal magnetic material preferably contains Fe as a main component.

A manufacturing method for a metal strip according to the present disclosure includes a step of making a continuous strip by injecting a metal melt, containing a metal magnetic material as a main component, onto a rotating body and rapidly cooling and solidifying the metal melt such that one main surface does not contact with the rotating body and an other main surface contacts with the rotating body; and a step of making a metal strip by subjecting the one main surface to surface treatment while conveying the continuous strip in a predetermined direction and continuously forming a striped pattern composed of a recessed portion and a protruding portion on the one main surface such that a surface roughness of the one main surface is higher than a surface roughness of the other main surface.

In the manufacturing method for a metal strip of the present disclosure, a distal end shape of a surface treatment tool is preferably transferred to the one main surface through surface treatment applied by causing the surface treatment tool to intermittently apply load on the one main surface of the continuous strip while subjecting the continuous strip to heat treatment.

Because the continuous strip is subjected to heat treatment in this way, an internal strain formed as a result of liquid quenching is removed, and the distal end shape of the surface treatment tool is transferred to the one main surface that has not contacted with the rotating body at the time of making the continuous strip. Thus, it is possible to easily make a metal strip in which a striped pattern, composed of recessed portions and protruding portions, is formed on one main surface.

A magnetic core according to the present disclosure is a magnetic core including any one of the above-described metal strips, wound in an annular shape, and the metal strip is wound such that the one main surface is faced outward.

In the magnetic core of the present disclosure, a core diameter is preferably less than or equal to 6 mm.

With this configuration, even when the core diameter is small and less than or equal to 6 mm, no structural defects, such as breakage and cracks, occur in the metal strip, and a magnetic core having good mechanical strength and toughness is obtained.

In the present disclosure, "core diameter" means the inside diameter of the magnetic core.

A coil component according to the present disclosure includes the above-described magnetic core, and a coil conductor.

The coil component of the present disclosure is preferably a common mode choke coil.

In the present disclosure, a strip before the above-described striped pattern is formed is simply referred to as strip or continuous strip, and a strip on which the striped pattern is formed through surface treatment is referred to as metal strip.

With the metal strip of the present disclosure, a metal strip contains a metal magnetic material as a main component, the metal strip having a film shape, the metal strip being formed such that a surface roughness of one main surface is higher than a surface roughness of an other main surface. The other main surface is formed in a smooth surface having a high surface smoothness, and the one main surface is subjected to surface treatment such that a striped pattern composed of a recessed portion and a protruding portion is continuously formed. Therefore, even when the metal strip is wound in an annular shape, the protruding portions are stretched in the circumferential direction, so a stress exerted on the metal strip is reduced to achieve high toughness. In other words, even when the core diameter (air core) is small, a stress exerted on the metal strip is reduced, so toughness is reinforced, and occurrence of structural defects, such as breakage and cracks, is suppressed, so a metal strip having good mechanical strength is obtained. In addition, because air sandwiched between metal strips during winding is released to the outside through the recessed portions of the striped pattern as an escape route, it is possible to remove an air layer that is formed between metal strips, so it is possible to increase permeability by improving close contact between the wound metal strips accordingly. Therefore, a large inductance is obtained even when the core diameter is small, so it is possible to improve magnetic characteristics.

With the manufacturing method for a metal strip of the present disclosure, the manufacturing method includes a step of making a continuous strip by injecting a metal melt, containing a metal magnetic material as a main component, onto a rotating body and rapidly cooling and solidifying the metal melt such that one main surface does not contact with the rotating body and an other main surface contacts with the rotating body; and a step of making a metal strip by subjecting the one main surface to surface treatment while conveying the continuous strip in a predetermined direction and continuously forming a striped pattern composed of a recessed portion and a protruding portion on the one main surface such that a surface roughness of the one main surface is higher than a surface roughness of the other main surface. Therefore, only the one main surface that has not contacted with the rotating body at the time of making a continuous strip is subjected to surface treatment. Thus, it is possible to easily make a metal strip on which a striped pattern composed of recessed portions and protruding portions is formed on one main surface.

With the magnetic core of the present disclosure, the magnetic core is a magnetic core in which any one of the above-described metal strips is wound in an annular shape, and the metal strip is wound such that the one main surface is faced outward. Therefore, when the metal strip is wound, the protruding portions extend in a transverse direction, so toughness is reinforced, and a stress exerted on the metal strip is effectively reduced. In other words, the toughness of the metal strip is reinforced even with a small air core, so it is possible to improve mechanical strength, and a magnetic core capable of suppressing occurrence of structural defects, such as breakage and cracks, is obtained.

With the coil component of the present disclosure, the coil component includes the above-described magnetic core and a coil conductor, so a coil component, such as a small common mode choke coil, having good toughness and capable of ensuring mechanical strength is obtained, and it is possible to contribute to a small, light-weight module component.

DETAILED DESCRIPTION

Next, an embodiment of the present disclosure will be described in detail.

Figure 1:
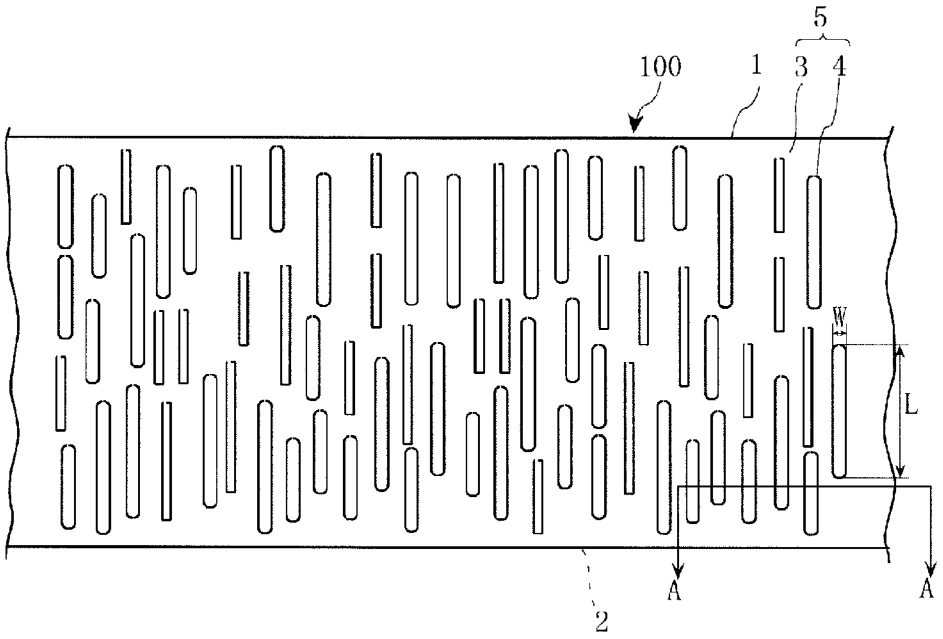
FIG. 1 is a relevant plan view schematically showing one embodiment of a metal strip according to the present disclosure.
Figure 2:
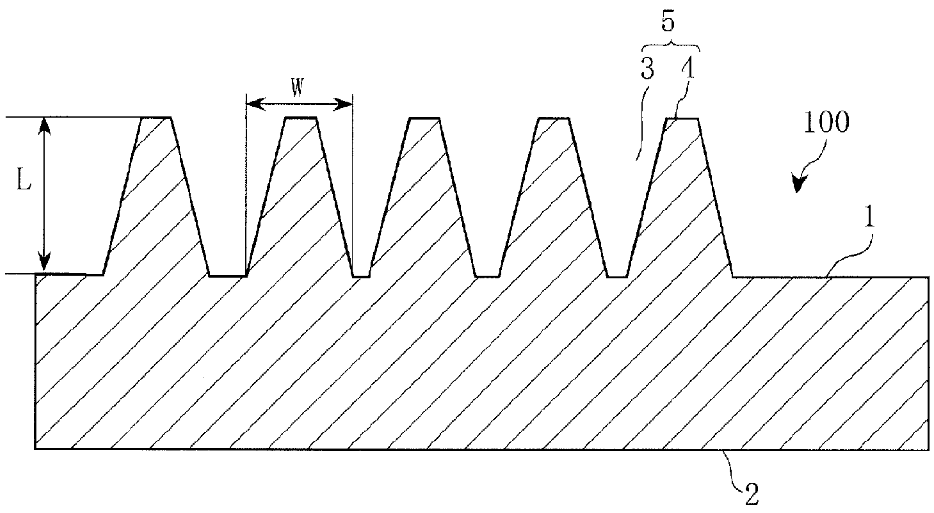
FIG. 2 is a relevant cross-sectional view of the metal strip.

FIG. 1 is a plan view schematically showing one embodiment of a metal strip according to the present disclosure. FIG. 2 is a cross-sectional view taken along the line A-A in FIG. 1.

The metal strip 100 contains a metal magnetic material as a main component, and is formed such that a surface roughness of one main surface 1 is higher than a surface roughness of the other main surface 2. Specifically, the other main surface 2 is formed in a smooth surface having a high surface smoothness, and the one main surface 1 is subjected to surface treatment such that a striped pattern 5 composed of recessed portions 3 and protruding portions 4 is continuously formed.

When the metal strip 100 is formed as described above and is wound in an annular shape such that the one main surface 1 is faced outward, the protruding portions 4 are stretched in a circumferential direction, so toughness is reinforced. With this configuration, a stress exerted on the metal strip 100 is reduced, so, even when a core diameter is small, it is possible to suppress occurrence of structural defects, such as breakage and cracks.

In other words, when a strip of which both main surfaces are smooth surfaces having a high surface smoothness is wound in an annular shape, the outside diameter is slightly greater than the inside diameter, and the outer side portion is stretched as compared to the inner side portion, so a stress is exerted on the strip. This stress may cause structural defects, such as breakage and cracks, to occur in the strip.

In this case, in the case where the core diameter is relatively large (for example, greater than or equal to 10 mm), when a magnetic core is formed such that one main surface of the strip is a free surface having a high surface roughness, the other main surface is a smooth surface having a high surface smoothness, and the strip is wound such that the one main surface 1 is faced outward, as in the case of Japanese Unexamined Patent Application Publication No. 56-153709, good toughness and mechanical strength are obtained.

However, in the case where the core diameter is less than or equal to, for example, 6 mm, when a strip is just merely wound in an annular shape such that the free surface of the strip is faced outward, a stress load due to a stretch of the outer side portion of the wound strip occurs, and structural defects, such as breakage and cracks, tend to easily occur.

For this reason, in the present disclosure, the metal strip 100 is obtained by further subjecting the above-described free surface to surface treatment to form a striped pattern 5 composed of successive recesses and protrusions, and, when the metal strip 100 is wound in an annular shape such that the striped pattern 5 is faced outward, the protruding portions 4 extend in the circumferential direction. In other words, when the metal strip 100 is wound in an annular shape, toughness is reinforced by stretching the protruding portions 4 in the circumferential direction. Therefore, even when the core diameter of the magnetic core is small, a stress exerted on the metal strip 100 is reduced, and, as a result, it is possible to suppress occurrence of structural defects, such as breakage and cracks, so the metal strip 100 having high toughness and good mechanical strength is obtained.

In addition, because air sandwiched between metal strips 100 during winding is released to the outside through the recessed portions 3 of the striped pattern 5 as an escape route, it is possible to remove an air layer that is formed between the metal strips 100, so it is possible to increase permeability by improving close contact between the wound metal strips 100 accordingly.

Therefore, a large inductance is obtained even when the core diameter is small, so it is possible to improve magnetic characteristics.

A maximum length L and maximum width W of each of the protruding portions 4 that compose the striped pattern 5 are not limited as long as a stretch that suppresses structural defects, such as breakage and cracks, is ensured when the metal strip 100 is wound, the maximum width W is preferably 5 to 60 μm, and more preferably 10 to 50 μm. The maximum length L is preferably 10 to 600 μm and more preferably 30 to 600 μm. Therefore, it is desirable to apply surface treatment tool by using a surface treatment tool (described later) such that these maximum width W and maximum length L are obtained.

The formation direction of the striped pattern 5 is not limited. The formation direction may be parallel to a longitudinal direction or preferably, in a vertical direction or substantially vertical direction relative to the longitudinal direction of the metal strip 100 as shown in FIG. 1 normally.

The metal magnetic material that is a main component of the metal strip 100 is also not limited as long as it is a metal magnetic material, and an Fe base material, such as Fe—Si—B—Cu—Nb, Fe—Si—B—P—Cu, Fe—P—B—C—Si—Ge—Al, Fe—Ni—P—B—C—Si—Ge—Al, Fe—Ni—Co—P—B—C—Si—Ge—Al, Fe—Si, Fe—Si—Cr, and Fe—Si—Al, containing Fe as a main component, may be used.

The thickness of the metal strip 100 is also not limited and normally formed with a thickness of 15 to 80 μm and preferably with a thickness of 20 to 30 μm.

The metal magnetic material may be crystalline; however, the metal magnetic material is more preferably amorphous with good soft magnetic characteristics.

The outside dimensions of the metal strip 100 are determined as needed according to the specifications required and formed into, for example, an overall length of about 1500 mm and an overall width of about 50 mm.

Incidentally, the metal strip 100 reinforces toughness and ensures mechanical strength by forming the continuous striped pattern 5, composed of the recessed portions 3 and the protruding portions 4, on the one main surface 1 and forming the other main surface 2 as a smooth surface having a high surface smoothness. To obtain desired mechanical strength and toughness, it is preferable to perform numerical management with a three-dimensional surface texture parameter, such as an arithmetic mean height Sa, a maximum height Sz, and a surface texture aspect ratio (hereinafter, simply referred to as aspect ratio) Str, which defines a three-dimensional surface roughness.

Hitherto, this type of surface roughness is generally managed by numerically managing a surface texture with a two-dimensional line roughness. In recent years, a two-dimensional parameter is extended, and a surface roughness is numerically managed with a stereoscopic three-dimensional parameter, and the details are defined in ISO25178 of International Standards Organization (ISO). The three-dimensional surface texture parameter enables stereoscopic evaluation of a surface texture, so it is possible to eliminate variations in measurement results due to the dependence of a measurement location or scanning direction as in the case of a two-dimensional surface texture parameter, and it is possible to numerically manage surface anisotropy that cannot be digitized with a two-dimensional surface texture parameter.

The three-dimensional surface texture parameter is a peak arithmetic mean curvature (hereinafter, simply referred to as arithmetic mean curvature) Spc, an interface developed area ratio (hereinafter, simply referred to as developed area ratio) Sdr, or the like, other than the above-described arithmetic mean height Sa, maximum height Sz, or aspect ratio Str, and the preferable ranges of these parameters will be described in detail.

(1) Arithmetic Mean Height Sa

An arithmetic mean height Sa is an arithmetic mean of the absolute values of heights from a reference plane in a region to be measured. Therefore, a large arithmetic mean height Sa indicates a low surface smoothness and a high surface roughness; whereas a small arithmetic mean height Sa indicates a high surface smoothness. To form a desired striped pattern 5, the surface roughness of the one main surface 1 is preferably greater than or equal to 0.2 μm and more preferably greater than or equal to 0.3 μm in terms of arithmetic mean height Sa, and the ratio of the surface roughness of the one main surface 1 to the surface roughness of the other main surface 2 in terms of arithmetic mean height Sa is preferably greater than or equal to five and more preferably greater than or equal to ten.

(2) Maximum Height Sz

A maximum height Sz is the sum (=Sp+Sv) of a maximum peak height Sp and a maximum valley depth Sv in a region to be measured. A large maximum height Sz indicates a low surface smoothness and a high surface roughness; whereas a small maximum height Sz indicates a high surface smoothness. To form a desired striped pattern 5, the surface roughness of the one main surface 1 is preferably greater than or equal to 2 μm and more preferably greater than or equal to 2.5 μm in terms of maximum height Sz, and the ratio of the surface roughness of the one main surface 1 to the surface roughness of the other main surface 2 in terms of maximum height Sz is preferably greater than or equal to two and more preferably greater than or equal to five.

(3) Aspect Ratio Str

An aspect ratio Str is defined as the ratio between a horizontal distance at which an autocorrelation function that is a periodicity evaluation index attenuates to a specific value latest and a horizontal distance at which the autocorrelation function attenuates to a specific value fastest and takes a value of 0≤Str <1. The aspect ratio Str is a scale indicating the uniformity of a surface texture. An isotropic surface having good uniformity is obtained as the aspect ratio approaches one; whereas nonuniformity increases and an anisotropic surface is obtained as the aspect ratio approaches zero. In the present embodiment, it is preferable that the first main surface 1 have the striped pattern 5 and, therefore, be a nonuniform anisotropic surface. From the above viewpoint, the surface roughness of the one main surface 1 is preferably less than or equal to 0.33 and more preferably less than or equal to 0.30 in terms of aspect ratio Str; whereas the ratio of the surface roughness of the one main surface 1 to the surface roughness of the other main surface 2 in terms of aspect ratio Str is preferably less than or equal to 0.9 and more preferably less than or equal to 0.85.

(4) Arithmetic Mean Curvature Spc

An arithmetic mean curvature Spc is a mean value of principal curvatures at peaks of a surface. A small arithmetic mean curvature Spc indicates that the protruding portions 4 are rounded; whereas a large arithmetic mean curvature Spc indicates that the protruding portions 4 are sharp. Because, for the arithmetic mean curvature Spc of the one main surface 1, the protruding portions 4 are preferably sharp, the surface roughness of the one main surface 1 is preferably greater than or equal to 400 (1/mm) and more preferably greater than or equal to 600 (1/mm) in terms of arithmetic mean curvature Spc, and the ratio of the surface roughness of the one main surface 1 to the surface roughness of the other main surface 2 in terms of arithmetic mean curvature Spc is preferably greater than or equal to two and more preferably greater than or equal to three.

(5) Developed Area Ratio Sdr

A developed area ratio Sdr indicates how much the developed area (surface area) of a region to be measured has increased relative to the area of the region to be measured. A developed area ratio Sdr is zero for a complete flat surface, and a developed area ratio Sdr increases when the surface has a slope. The surface roughness of the first main surface 1 that needs to have a striped pattern 5 is preferably greater than or equal to 0.010 and more preferably greater than or equal to 0.015 in terms of developed area ratio Sdr, and the ratio of the surface roughness of the first main surface 1 to the surface roughness of the second main surface 2 in terms of developed area ratio Sdr is preferably greater than or equal to 20 and more preferably greater than or equal to 30.

In the present embodiment, it is preferable that the surface roughness be numerically managed so as to satisfy at least one or more of the numeric value ranges described in the above (1) to (5), particularly, at least one or more of the numeric value ranges described in (1) to (3).

In this way, the metal strip 100 contains a metal magnetic material as a main component, the metal strip 100 is formed such that the surface roughness of the one main surface 1 is higher than the surface roughness of the other main surface 2, the other main surface 2 is formed in a smooth surface having a high surface smoothness, and the one main surface 1 is subjected to surface treatment such that the striped pattern 5 composed of a recessed portion 3 and a protruding portion 4 is continuously formed. Therefore, the protruding portions 4 are stretched in the circumferential direction even when the metal strip 100 is wound in an annular shape, so a stress exerted on the metal strip 100 is reduced to achieve high toughness. In other words, even when the core diameter is small, a stress exerted on the metal strip 100 is reduced, so toughness is reinforced, and occurrence of structural defects, such as breakage and cracks, is suppressed, so a metal strip having good mechanical strength is obtained. In addition, because air sandwiched between metal strips 100 during winding is released to the outside through the recessed portions 3 of the striped pattern 5 as an escape route, it is possible to remove an air layer formed between metal strips 100, so it is possible to increase permeability by improving close contact between the wound metal strips 100 accordingly. Therefore, a large inductance is obtained even when the core diameter is small, so it is possible to improve magnetic characteristics.

Next, a manufacturing method for the metal strip will be described in detail.

A manufacturing method for a metal strip includes a continuous strip making step of continuously making a strip from a metal melt, and a striped pattern impartment step of imparting a striped pattern by applying surface treatment to one main surface of the continuous strip, and the continuous strip step and the striped pattern impartment step are successively performed.

Figure 3:
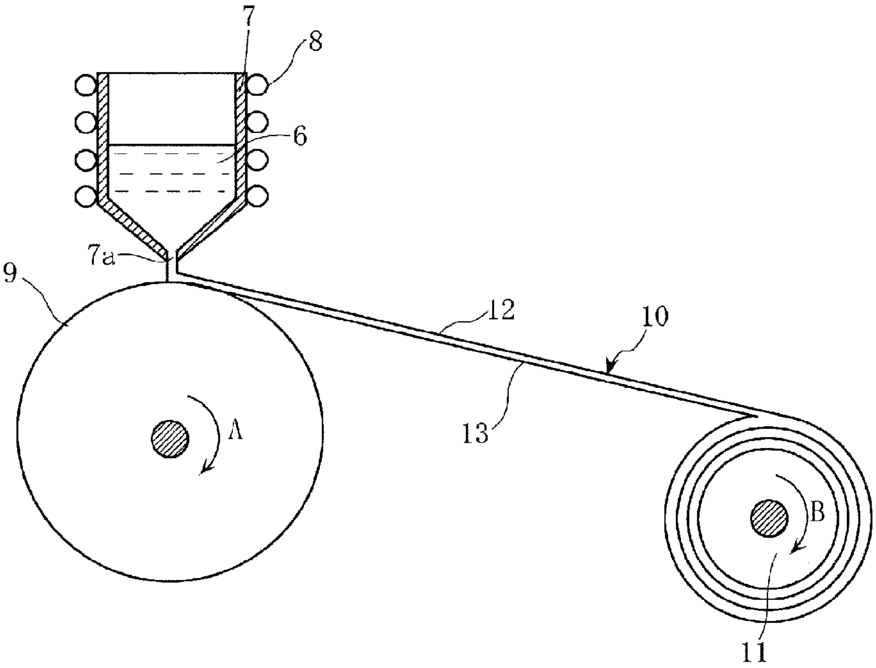
FIG. 3 is a view (1/2) for illustrating one embodiment of a manufacturing method for a metal strip according to the present disclosure.

FIG. 3 is a view schematically showing one embodiment of the continuous strip making step. In the present embodiment, a continuous strip is made by a single-roll liquid quenching method.

In other words, in the continuous strip making step, a melting pot 7 made of alumina or the like, in which a metal melt 6 is contained, an induction heating coil 8 disposed around the melting pot 7, a roll (rotating body) 9 made of Cu or the like, which rotates at high speed in a direction of an arrow A, and a first take-up portion 11 that rotates in a direction of an arrow B to take up the continuous strip 10 are provided.

The continuous strip 10 may be manufactured as follows.

Initially, element simple substances, such as Fe, Si, B, and P, which make up an Fe base metal magnetic material, or chemical compounds containing these elements are prepared as raw materials, weighed in predetermined amounts and mixed, heated to a melting point or higher with the use of a high-frequency induction heating furnace or the like, and then cooled to obtain a mother alloy.

Subsequently, the mother alloy is crushed and then put into the melting pot 7. Then, the melting pot 7 is heated by applying high-frequency power to the induction heating coil 8 to melt the mother alloy, thus making a metal melt 6.

After that, the metal melt 6 is injected from a nozzle 7*a* of the melting pot 7 in the direction of the arrow A and dropped onto the roll 9 rotating at high speed. As a result, the metal melt 6 is rapidly cooled and solidified by the roll 9 into an amorphous continuous strip 10 and is taken up by the first take-up portion 11 rotating in the direction of the arrow B.

In the thus formed continuous strip 10, an other main surface 13 that contacts with the roll 9 becomes a smooth surface having a high surface smoothness because the other main surface 13 is bound by the profile irregularity of the roll 9, and one main surface 12 becomes a free surface that does not contact with the roll 9 and is formed to have a low surface smoothness and an adequate surface roughness as compared to the other main surface 13.

Figure 4:
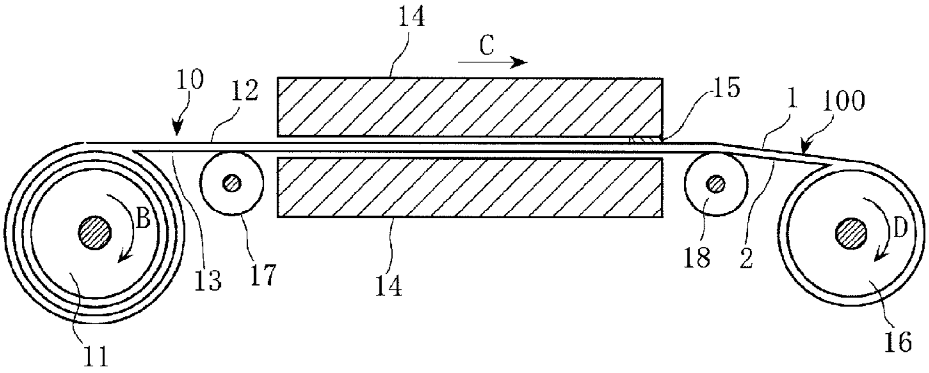
FIG. 4 is a view (2/2) for illustrating one embodiment of the manufacturing method for a metal strip according to the present disclosure.

FIG. 4 is a view schematically showing one embodiment of the striped pattern impartment step.

In other words, in the striped pattern impartment step, a heating furnace 14 that applies heat treatment to the continuous strip 10 taken up by the first take-up portion 11, a surface treatment tool 15 attached to the distal end portion of the heating furnace 14, a second take-up portion 16 that takes up a metal strip 100 subjected to surface treatment with the surface treatment tool 15, a first guide roller 17 that guides the continuous strip 10 to the heating furnace 14, and a second guide roller 18 that guides the metal strip 100 conveyed from the heating furnace 14 to the second take-up portion 16 are provided.

The surface treatment tool 15 reciprocates in a vertical direction relative to the continuous strip 10 conveyed in the direction of an arrow C, intermittently applies load on the first main surface 12 for surface treatment, and continuously forms a striped pattern 5, composed of recessed portions 3 and protruding portions 4, on the surface-treated first main surface 1. In other words, the distal end of the surface treatment tool 15 is configured such that the striped pattern 5 is formed on the first main surface 1 of the surface-treated metal strip 100 by shape transfer.

In other words, in the striped pattern impartment step, the continuous strip 10 taken up by the first take-up portion 11 is guided to the heating furnace 14 via the first guide roller 17 and conveyed in the direction of the arrow C and subjected to heat treatment in the heating furnace 14 to remove a thermal strain in the continuous strip 10 and, where necessary, crystallizes the continuous strip 10, and the continuous strip 10 is subjected to surface treatment with the surface treatment tool 15. Specifically, the surface treatment tool 15 is reciprocated in the vertical direction relative to a direction in which the continuous strip 10 is conveyed to transfer the distal end shape of the surface treatment tool 15 to the first main surface 12 of the continuous strip 10. As a result, the metal strip 100 in which the striped pattern 5 is formed on the surface-treated first main surface 1 is obtained, and the metal strip 100 is taken up by the second take-up portion 16 via the second guide roller 18.

In this way, the manufacturing method for a metal strip includes a step of making a continuous strip 10 by injecting a metal melt 6 containing a metal magnetic material as a main component onto the roll 9 rotating in the direction of the arrow A to rapidly cool and solidify the metal melt 6 and bringing one main surface 12 not in contact with the roll 9 and bringing an other main surface 13 into contact with the roll 9, and a step of making a metal strip by applying surface treatment to the one main surface 12 while conveying the continuous strip 10 in the direction of the arrow C, continuously forming a striped pattern 5 composed of a recessed portion 3 and a protruding portion 4 on the one main surface 1 such that the surface roughness of the surface-treated one main surface 1 is higher than the surface roughness of the other main surface 2. Therefore, surface treatment is applied to only the one main surface 12 that has not contacted with the roll 9 at the time of making a continuous strip. Thus, the striped pattern 5 composed of the recessed portions 3 and the protruding portions 4 is formed on the surface-treated one main surface 1, so it is possible to easily make a desired metal strip 100.

Moreover, the continuous strip 10 is subjected to heat treatment, so an internal strain formed as a result of liquid quenching is effectively removed.

Figure 5:
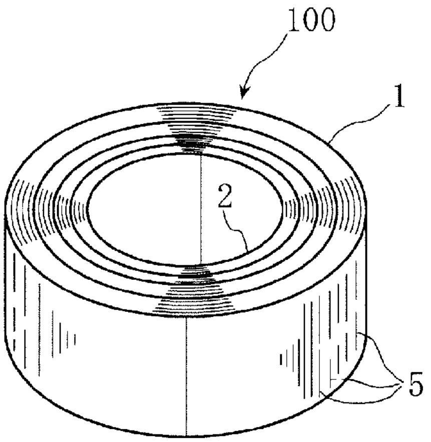
FIG. 5 is a perspective view schematically showing one embodiment of a magnetic core according to the present disclosure.

FIG. 5 is a perspective view schematically showing one embodiment of a magnetic core obtained by using the metal strip.

As shown in FIG. 5, in the magnetic core, the metal strip 100 is wound in an annular shape such that the first main surface 1 on which the striped pattern 5 is formed to achieve a high surface roughness is faced outward and the other main surface 2 that is a smooth surface having a high surface smoothness is located to face inward.

Figure 6:
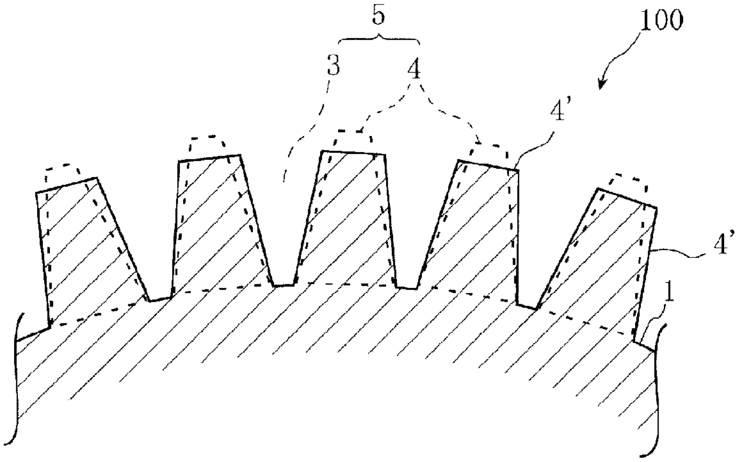
FIG. 6 is a relevant cross-sectional view of the magnetic core.

FIG. 6 is a cross-sectional view schematically showing an example of an outer periphery of the magnetic core.

In FIG. 6, the metal strip 100 has the striped pattern 5 composed of the recessed portions 3 and the protruding portions 4 as represented by the dashed line before winding, and, when wound, protruding portions 4' are stretched in the circumferential direction, with the result that a stress exerted on the metal strip 100 is suppressed. In other words, when the striped pattern 5 composed of the recessed portions 3 and the protruding portions 4 is continuously formed, a stress exerted on the metal strip 100 is reduced. Therefore, even when a magnetic core having a small core diameter is formed by winding the metal strip 100 in an annular shape, a magnetic core having high toughness and good mechanical strength and capable of suppressing structural defects, such as cracks, in the metal strip 100 can be obtained.

In addition, because air sandwiched between metal strips 100 during winding is released to the outside through the recessed portions 3 of the striped pattern 5 as an escape route, it is possible to remove an air layer formed between metal strips, so close contact between the metal strips improves to enhance permeability, with the result that a large inductance is obtained, and it is possible to improve magnetic characteristics.

Figure 7:
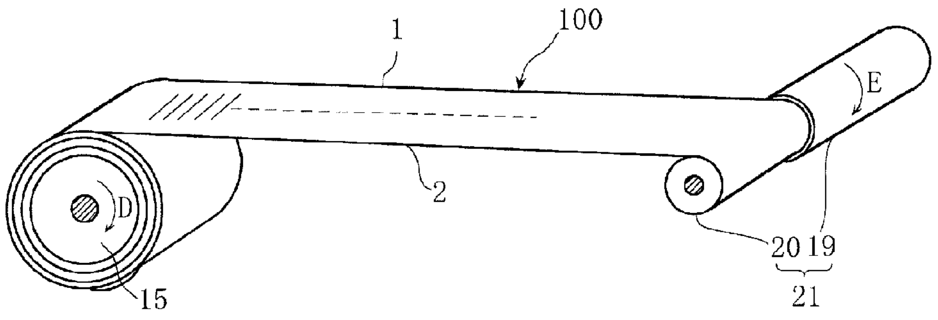
FIG. 7 is a manufacturing process diagram showing one embodiment of a manufacturing method for a magnetic core according to the present disclosure.

FIG. 7 is a view schematically showing one embodiment of a manufacturing method for a magnetic core. In the present embodiment, the manufacturing method for a magnetic core is performed as a step subsequent to the manufacturing step for a metal strip, shown in FIG. 3 and FIG. 4.

In other words, in the manufacturing method, initially, a core rod 21 having a small-diameter portion 20 with a diameter of less than or equal to 6 mm and a large-diameter portion 19 greater than the small-diameter portion 20 is prepared. Then, while the core rod 21 is being rotated in a direction of an arrow E, the metal strip 100 taken up by the second take-up portion 15 is guided to the outer periphery of the core rod 21 to wind the metal strip 100 a number of times so as to be in close contact with the outer periphery of the core rod 21, thus winding the metal strip 100 around the small-diameter portion 20 of the core rod 21. After that, the core rod 21 is separated from the metal strip 100. Thus, a magnetic core is made.

Figure 8:
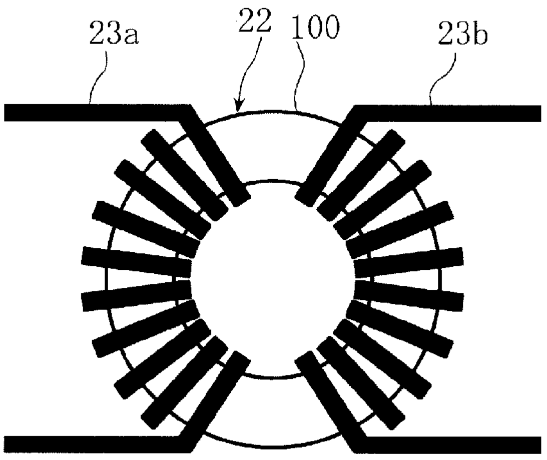
FIG. 8 is a front view of a common mode choke coil as a coil component according to the present disclosure.

FIG. 8 is a front view showing one embodiment of a coil component using the magnetic core. The coil component represents a common mode choke coil.

In other words, the common mode choke coil is configured such that first and second coil conductors **23*a*, 23*b* are wound around an annular magnetic core 22 in opposite winding directions from each other, a common mode current flows through the first coil conductor 23*a*, and a normal mode current flows through the second coil conductor 23*b***.

In the thus configured common mode choke coil, noise components are transmitted in common mode, and signal components are transmitted in normal mode, so noise is reduced by separating signals and noise from each other by using a difference between these transmission modes.

Since the magnetic core 22 of the common mode choke coil is formed from the above-described metal strip 100 of the present disclosure, even when the core diameter is small and less than or equal to 6 mm, it is possible to suppress occurrence of structural defects, such as cracks, a small common mode choke coil having high toughness and good mechanical strength is obtained, and it is possible to contribute to a small, light-weight module component.

The present disclosure is not limited to the above-described embodiment. For example, in the above-described embodiment, a common mode choke coil is illustrated as a coil component; however, the coil component is applicable to various coil components that require a small core diameter and that use a metal magnetic material.

Next, examples of the present disclosure will be specifically described.

Example 1

[Making Sample]

Fe, Si, B, and $Fe_3P$ were prepared as raw materials, mixed at a predetermined composition, and heated to a melting point or higher in a high-frequency induction heating furnace to be melted. Subsequently, the melt was poured into a copper casting mold and cooled. Thus, a mother alloy was made.

Subsequently, the mother alloy was crushed into pieces of about 5 mm in size and put into a melting pot of a single-roll liquid quenching apparatus. Then, the mother alloy was subjected to high-frequency induction heating to be melted. Thus, a metal melt was obtained.

After that, the metal melt was injected from a distal end nozzle of the melting pot, and poured onto a roll rotating at high speed to be rapidly cooled and solidified. Thus, a continuous strip in which a strip is continuously formed was made.

Subsequently, the continuous strip was caused to pass through a heating furnace adjusted to a temperature of 400° C. and to which a surface treatment tool was attached near an exit, and the continuous strip was subjected to heat treatment to remove a thermal strain. At the same time, the surface treatment tool was reciprocated in a vertical direction relative to a first main surface of the continuous strip, and the surface treatment tool was caused to intermittently apply load on the continuous strip. Thus, a sample (metal strip) in which the distal end shape of the surface treatment tool was transferred to the first main surface and a striped pattern composed of recessed portions and protruding portions was continuously formed was made. The outside dimensions of the sample were a length of 100 m, a width of 50 mm, and a thickness of 25 μm.

[Evaluation of Sample]

For the first and second main surfaces of the sample made, a laser microscope (made by Keyence, shape analysis laser microscope VK-X series) was used to carry out three-dimensional image analysis, and various surface roughness parameters (arithmetic mean roughness Sa, maximum height Sz, aspect ratio Str, arithmetic mean curvature Spc, and developed area ratio Sdr) were calculated in compliant with ISO25178. A region to be subjected to image analysis was 280 μm long and 200 μm wide.

Table 1 shows the measurement results of surface roughness for each of the first main surface and the second main surface, and the ratio of the first main surface to the second main surface.

TABLE 1

| | ARITHMETIC MEAN HEIGHT Sa (μm) | MAXIMUM HEIGHT Sz (μm) | ASPECT RATIO Str (-) | ARITHMETIC MEAN CURVATURE Spc (1/mm) | DEVELOPED AREA RATIO Sdr (-) |
|---|---|---|---|---|---|
| FIRST MAIN SURFACE | 0.31 | 2.5 | 0.31 | 765 | 0.02 |
| SECOND MAIN SURFACE | 0.024 | 0.46 | 0.35 | 236 | 0.0008 |
| RATIO (FIRST MAIN SURFACE/ SECOND MAIN SURFACE) | 12.9 | 5.4 | 0.9 | 3.2 | 25 |

(1) Arithmetic Mean Height Sa

The arithmetic mean height Sa of the second main surface not subjected to surface treatment was 0.024 μm that was small and high in surface smoothness; whereas the arithmetic mean height Sa of the first main surface was 0.31 μm since the first main surface subjected to surface treatment had a striped pattern. In other words, when evaluated in the arithmetic mean height Sa of the three-dimensional surface texture parameters, it was found that the surface roughness of one main surface was 12.9 times, that is, greater than ten times as high as the mean roughness of the other main surface and the striped pattern in a desired shape of recesses and protrusions was continuously formed on the first main surface.

(2) Maximum Height Sz

The maximum height Sz of the second main surface not subjected to surface treatment was 0.46 μm that was a small difference in level; whereas the maximum height Sz of the first main surface subjected to surface treatment was 2.5 μm that was a large difference in level. The ratio was 5.4 that was five times or more. Therefore, it was found that, even when surface roughness was evaluated in maximum height Sz, the first main surface was sufficiently rougher than the second main surface and the first main surface had a continuously formed striped pattern in a desired shape of recesses and protrusions.

(3) Aspect Ratio Str

The aspect ratio Str of the second main surface not subjected to surface treatment was 0.35; whereas the aspect ratio Str of the first main surface subjected to surface treatment was 0.31, and the ratio was 0.9. In other words, since the first main surface was less in aspect ratio Str than the second main surface, it was found that surface anisotropy was stronger than that of the second main surface, the surface was not uniform, and the first main surface had a continuously formed striped pattern in a desired shape of recesses and protrusions.

(4) Arithmetic Mean Curvature Spc

The second main surface not subjected to surface treatment was 236 (1/mm); whereas the first main surface subjected to surface treatment was 765 (1/mm), and the ratio was 3.2. In other words, it was found that the surface shape of the first main surface was sufficiently sharp as compared to the surface shape of the second main surface.

(5) Developed Area Ratio Sdr

The second main surface not subjected to surface treatment was 0.0008 that was close to substantially a complete smooth surface; whereas the first main surface subjected to surface treatment was 0.02, and the ratio was 25. In other words, it was found that the surface of the first main surface was sufficiently rougher than the surface of the second main surface.

Example 2

Magnetic cores having core diameters of 4 mm, 6 mm, and 12 mm were made ten for each by using the metal strip of Example 1 as samples of the present disclosure.

In addition, magnetic cores having core diameters of 4 mm, 6 mm, and 12 mm were made ten for each by using the continuous strip not subjected to surface treatment in Example 1 as samples of a comparative example.

The samples of the present disclosure and the samples of the comparative example were visually observed and observed with a light microscope to check whether structural defects, such as breakage and cracks, were occurring.

Table 2 shows the fraction defective of each of the samples of the present disclosure and the samples of the comparative example.

TABLE 2

| | CORE DIAMETER (mm) | | |
|---|---|---|---|
| | 4 | 6 | 12 |
| PRESENT EMBODIMENT | 0/10 | 0/10 | 0/10 |
| COMPARATIVE EXAMPLE | 10/10 | 5/10 | 0/10 |

As is apparent from Table 2, when the core diameter was 12 mm, there were no defective products that developed structural defects, such as breakage and cracks, in both the present disclosure and the comparative example.

However, when the core diameter was 6 mm, there were no defective products in the samples of the present disclosure; whereas there were five defective products out of ten in the samples of the comparative example, and it was found that the yields of products were decreased.

In addition, when the core diameter was 4 mm, no structural defects were recognized in the samples of the present disclosure; whereas structural defects occurred in all the ten samples of the comparative example.

It was found from above that, with the samples of the present disclosure, different from the samples of the comparative example, a magnetic core having good mechanical strength, including toughness, was obtained even when the core diameter was small.

A metal strip having good mechanical strength and toughness and a manufacturing method therefor, capable of suppressing structural defects, such as cracks, when wound even with a core diameter less than or equal to 6 mm, are achieved.

What is claimed is:

1. A metal strip comprising:
a metal magnetic material as a main component, the metal strip having a film shape and being configured such that a surface roughness of one main surface is higher than a surface roughness of an other main surface,
wherein the other main surface has a smooth surface having a surface smoothness higher than a surface smoothness of at least the one main surface in terms of an arithmetic mean height that is a three-dimensional surface texture parameter,
the one main surface has a striped pattern, including a recessed portion and a protruding portion, that is continuous along the one main surface, and
the surface roughness of the one main surface is greater than or equal to five times as high as the surface roughness of the other main surface in terms of an arithmetic mean height that is a three-dimensional surface texture parameter.

2. The metal strip according to claim 1, wherein
the striped pattern is formed in a vertical direction relative to a longitudinal direction of the one main surface.

3. The metal strip according to claim 1, wherein
the surface roughness of the one main surface is greater than or equal to ten times as high as the surface roughness of the other main surface in terms of the arithmetic mean height.

4. The metal strip according to claim 1, wherein
the surface roughness of the one main surface is greater than or equal to twice as high as the surface roughness of the other main surface in terms of a maximum height that is a three-dimensional surface texture parameter.

5. The metal strip according to claim 1, wherein
the surface roughness of the one main surface is less than or equal to 0.9 times as high as the surface roughness of the other main surface in terms of an aspect ratio that is a three-dimensional surface texture parameter.

6. The metal strip according to claim 1, wherein
the protruding portion has a maximum width of 5 μm to 60 μm.

7. The metal strip according to claim 1, wherein
the protruding portion has a maximum length of 10 μm to 600 μm.

8. The metal strip according to claim 1, wherein
the metal magnetic material is amorphous.

9. The metal strip according to claim 1, wherein
the metal magnetic material contains Fe as a main component.

10. A magnetic core comprising the metal strip according to claim 1, wherein
the metal strip is wound in an annular shape, such that the one main surface on which the striped pattern is formed face outward.

11. The magnetic core according to claim 10, wherein a core diameter is less than or equal to 6 mm.

12. A coil component comprising:

the magnetic core according to claim 10; and a coil conductor.

13. The coil component according to claim 12, wherein the coil component is a common mode choke coil.

14. The metal strip according to claim 2, wherein the surface roughness of the one main surface is greater than or equal to twice as high as the surface roughness of the other main surface in terms of a maximum height that is a three-dimensional surface texture parameter.

15. The metal strip according to claim 2, wherein the surface roughness of the one main surface is less than or equal to 0.9 times as high as the surface roughness of the other main surface in terms of an aspect ratio that is a three-dimensional surface texture parameter.

16. The metal strip according to claim 2, wherein the protruding portion has a maximum width of 5 μm to 60 μm.

* * * * *